UNITED STATES PATENT OFFICE.

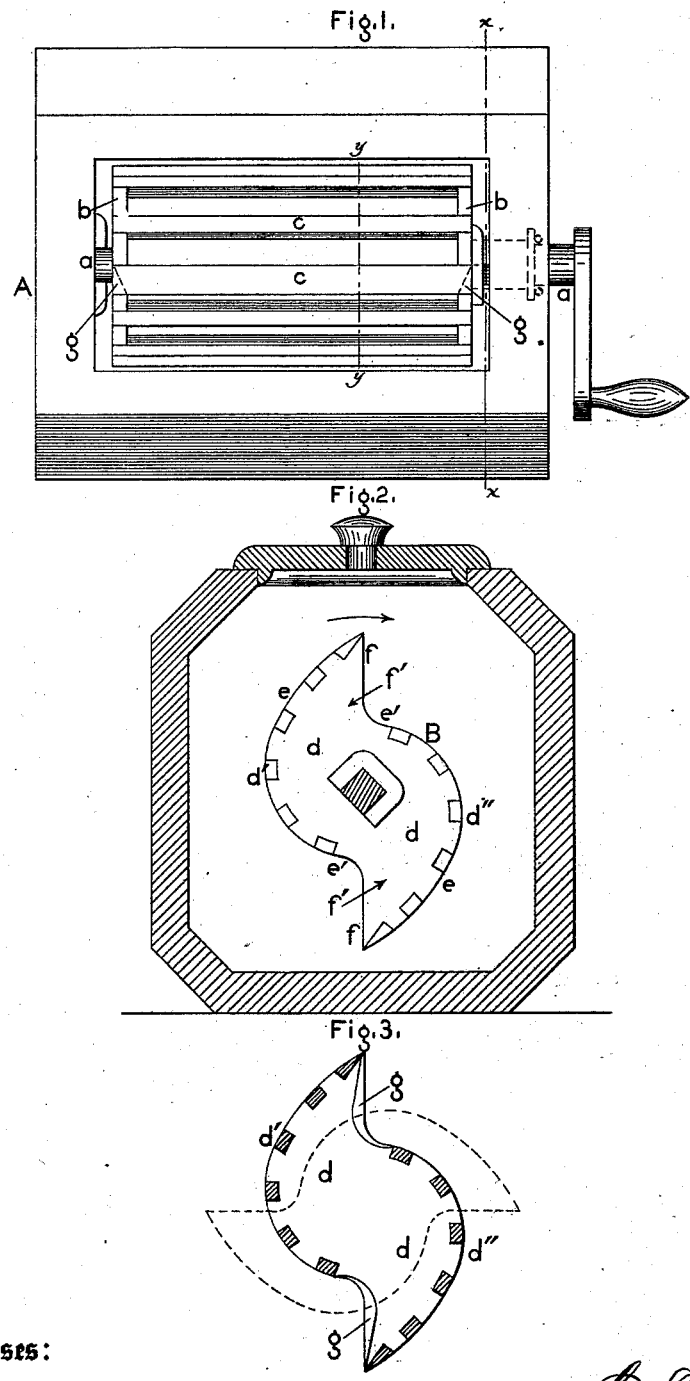

GEORGE R. NEBINGER, OF PHILADELPHIA, PENNSYLVANIA, ASSIGNOR OF ONE-HALF OF HIS RIGHT TO JAMES M. KREAMER, OF SAME PLACE.

CHURN.

SPECIFICATION forming part of Letters Patent No. 223,652, dated January 20, 1880.

Application filed October 23, 1879.

*To all whom it may concern:*

Be it known that I, GEORGE R. NEBINGER, of the city and county of Philadelphia, and State of Pennsylvania, have invented a new and useful Improvement in Churns, which improvement is fully set forth in the following specification and accompanying drawings, in which—

Figure 1 is a top or plan view of the inside of the churn embodying my invention. Fig. 2 is a vertical section thereof in line $x\,x$, Fig. 1. Fig. 3 is a vertical section of the dasher in line $y\,y$, Fig. 1.

Similar letters of reference indicate corresponding parts in the several figures.

My invention consists of the dasher of a churn formed of slats connected to heads the edges whereof are double elliptical curves in reverse order, united at the ends of the heads, thus producing two pockets, which meet at their widest parts, so that as the butter comes its particles are rolled from one pocket to the other, and thus all gathered within the dasher and the buttermilk expressed.

Referring to the drawings, A represents the body of the churn, and B the dasher, which is mounted on the sides of the body by means of gudgeons $a$, secured to or engaging with the heads of the dasher, so that the interior of the dasher is not occupied by a shaft or bearing.

The dasher is constructed of heads $b$ and slats $c$, and forms two scoop shaped pockets, $d\,d$, continuous of each other, and united at their widest part. This construction is due to the shape of the heads $b$, the opposite edges $d'\,d''$ of each of which are double elliptical curves $e\,f\,e\,f$ in reverse order, and meet at their ends. The curve of one edge, $d'$, swells, as at $e$, from the point of the head to a place, $e'$, beyond the center of the head, and then depresses, as at $f$, to the opposite point of the head. The other edge, $d''$, swells and depresses in opposite direction to that of the edge $d'$, and the points of both edges unite.

The slats $c$ are connected to the swell portions $e$ of the heads, and the portions $f$ are unslatted, thus leaving throats $f'$, which lead into the dasher.

It will be seen that when the butter forms it is taken through the throats $f'$ into one of the pockets $d$, and rolls and drops therefrom into the other pocket, and thus all particles are brought together and gathered within the dasher.

The dropping of the butter from one pocket to the other serves to work it and in a measure express the buttermilk, and the rolling of the butter in each pocket prevents lifting of the same, the dasher thus being operated with ease.

The sides of the unslatted portions $f$ of the heads are beveled, as at $g$, thus causing particles of butter that strike the sharp or thin edges of the top of the portions $f$ to be deflected inwardly, and thus pass into the throats of the dasher, and avoiding the entrance of such particles between the dasher and body.

In the patent heretofore granted to me the dasher is formed of slatted wings; but there is no provision for causing the butter to roll from one pocket to the other and to be gathered within the dasher.

Having thus described my invention, what I claim as new, and desire to secure by Letters Patent, is—

The dasher constructed of heads $b$, the edges whereof have double elliptical curves $e\,f$ in reverse order, and are united at their ends, and the slats $c\,c$, forming the scoop-shaped pockets $d\,d$ and throats $f'$, substantially as and for the purpose set forth.

GEO. R. NEBINGER.

Witnesses:
 JOHN A. WIEDERSHEIM,
 A. P. GRANT.